Sept. 7, 1926.  
D. L. GORDON ET AL  
1,599,173  
PILOT CONTROLLED SAFETY DEVICE FOR ELECTRICALLY OPERATED FUEL VALVES  
Filed July 13, 1925
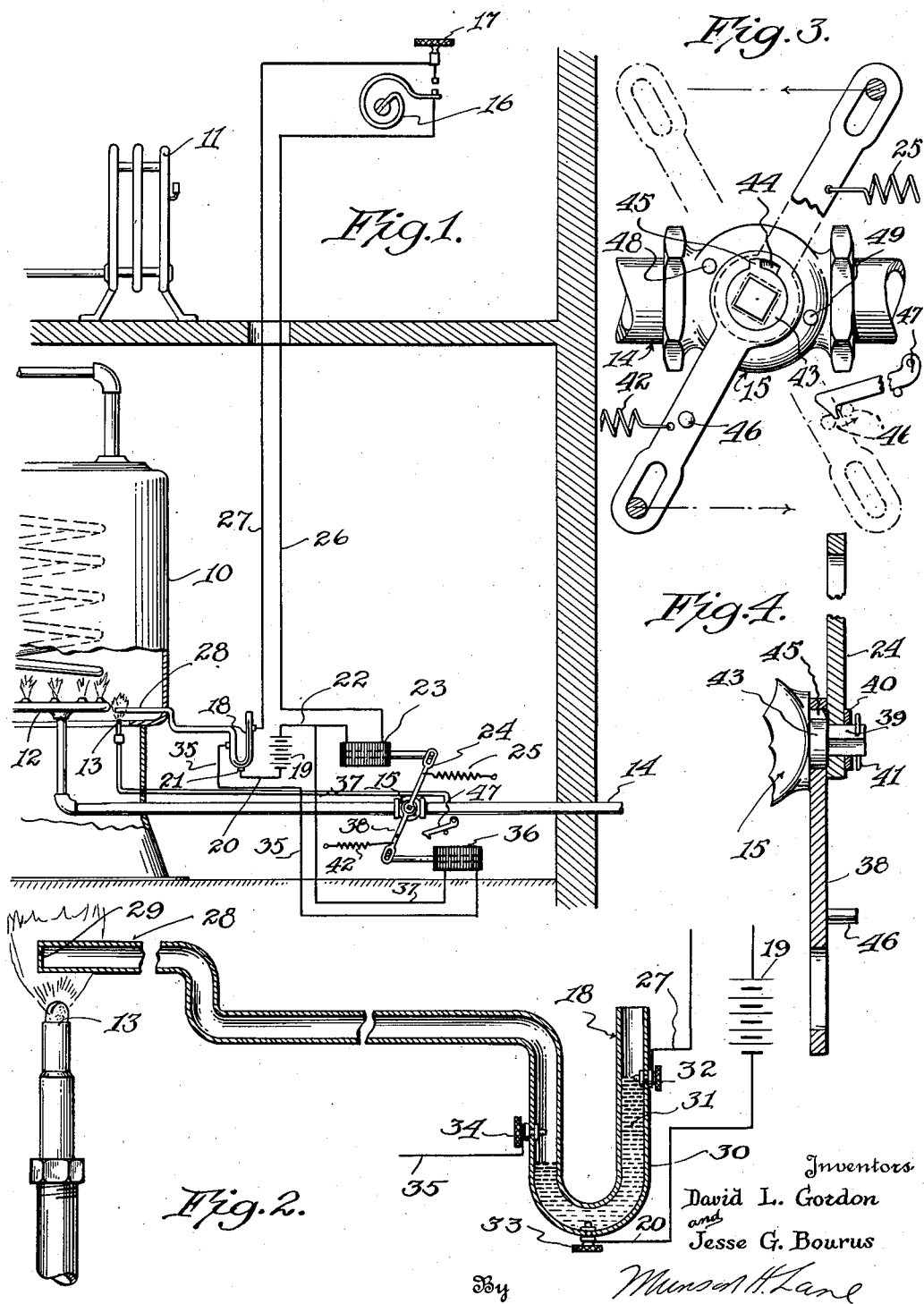
Inventors  
David L. Gordon  
and  
Jesse G. Bourus  
By  
Munson H. Lane  
Attorney Patented Sept. 7, 1926.

1,599,173

UNITED STATES PATENT OFFICE.

DAVID L. GORDON AND JESSE G. BOURUS, OF TACOMA, WASHINGTON.

PILOT-CONTROLLED SAFETY DEVICE FOR ELECTRICALLY-OPERATED FUEL VALVES.

Application filed July 13, 1925. Serial No. 43,212.

The invention relates to a pilot controlled safety device for electrically operated fuel valves. The invention provides an added safety control for any automatic electric control on an appliance burning a fuel which is to be ignited by a pilot light.

The object of the invention is to insure furnaces, boilers, water heaters, ovens and all appliances using a pilot light as the means of igniting a fuel, and using electricity as the motive power for operating the valve controlling the main supply line, against any possible explosion, by shutting off the fuel valve and rendering it impossible to be opened while the pilot light is out. The device used to accomplish this result makes use of the expansion of a fluid to make and break electric circuits.

The improved safety device is designed to insure more positive operation, a greater range of adjustability, greater sensitiveness and a larger field of usefulness than control devices hitherto known in the art.

The invention will be more fully understood by reference to the accompanying drawings showing an illustrative embodiment of the invention.

In the drawings,

Fig. 1 is a diagrammatic view of a heating system showing automatic means for controlling the supply of fuel to the heater.

Fig. 2 is a view partly in section and partly in elevation showing the pilot operated device for making and breaking an electric circuit which controls the fuel supply to the heater.

Fig. 3 is an elevation showing one form of fuel valve,

Fig. 4 is a section on line 4—4 of Fig. 3.
Referring first to Fig. 1, the reference numeral 10 denotes a heater of any desired type, herein shown as a water heater supplying heating units located in various rooms of a building, one of the heating units being shown at 11. While a water heater is herein shown, the invention is equally applicable to all types of furnaces, boilers, water heaters, ovens and all appliances using a pilot light as the means for igniting the fuel supplied thereto.

As shown, the heating device 10 is provided with a main burner 12 of any desired type designed to be ignited by a suitable pilot burner 13. The fuel used is preferably gas, though the invention is applicable to liquid fuel as well, and is supplied through a main pipe 14 in which is located a control valve denoted generally by the reference numeral 15.

As shown the valve 15 is electrically operated and the circuit may be controlled by a suitable thermostat 16, or manually by means of a push button 17. All the parts described above, are or may be of standard construction and form no part of the present invention except in the combination hereinafter set forth.

According to existing practice, it is possible for a thermostat to open the fuel valve while the pilot light is out. If the fuel used be gas, this results in filling the furnace with gas and a disastrous explosion may ensue, while if liquid fuel is used leakage and waste of the fuel results. The present invention is designed to eliminate these disadvantages by providing means for cutting off the fuel supply when the pilot light is out, and for positively preventing the reopening of the fuel valve, while the pilot light is out.

As shown, the electric circuit, which includes the thermostat 16 includes also a fluid operated circuit closer designated generally by the reference numeral 18, which is controlled by the pilot light 13, as will be more fully described hereinafter. The circuit controlled by the thermostat includes a source of electrical supply 19 which is connected by means of a wire 20 to a terminal 21 of the circuit closer 18, and to the coil of a solenoid 23 by means of a wire 22. The core of the solenoid operates the valve 15 by means of a lever arm 24, a tension spring 25 being provided which tends to close the valve 15 when the solenoid is no longer energized. The circuit is continued from the coil of the solenoid by means of a wire 26 leading to the thermostat 16, and thence by means of a wire 27 back to the circuit closer 18.

It will be noted that there are two control devices in the circuit, one at the thermostat 16 or push button 17, and the other at the circuit closer. The latter is a switch controlled by the pilot light and operated by the expansion of a fluid. As shown, the closed end 29 of a metallic tube 28 extends through the wall of the heater 10, and is in close proximity to the pilot light 13. At its other end, the tube 28 is connected to a glass U tube 30 having a mercury seal 31 therein. There are three contacts 32, 33 and 34 in said tube, the contacts 32 and 33 being connected to the wires 27 and 20 respectively in the thermostat circuit, while the contact 34 is connected to a wire 35 which forms part of a branch circuit operating the positive cut-off mechanism in case the pilot light goes out.

The operation of the circuit closer will be evident from the foregoing description. When the pilot light is burning the fluid, (generally air) in the tube 28, expands and forces the mercury downward in the left leg of the tube and upward in the right leg, thus closing the circuit between contacts 32 and 33. Thus, as long as the pilot light is burning, the fuel valve 15 is freely responsive to the thermostatic control 16 or push button 17.

If, however, the pilot light 13 goes out, the air in tube 28 contracts and the mercury in the U tube 30 closes the circuit between contacts 33 and 34, while the level of the mercury in the right leg of the tube falls below the contact 32, thus breaking the thermostatic circuit, and rendering it unresponsive to the operation of the thermostat 16 or push button 17 as long as the pilot light is out.

Completing the connection between contacts 33 and 34, closes a circuit which operates a means for positively preventing the opening of the fuel valve 15. As shown, this circuit includes a second solenoid 36 and a wire 37 which leads from the coil of the solenoid to the battery 19, thus completing the circuit.

The core of the solenoid 36 operates a lever 38 by means of which the fuel valve 15 may be operated to cut off the supply of fuel. So long as the solenoid is energized, the valve will remain closed, and no further supply of fuel will be received by the furnace. It is, however, sometimes desirable to provide, in addition, a positive mechanical locking device which will hold the valve in closed position, after the pilot light has been extinguished, until the pilot light is relighted and the locking device manually released.

One such mechanism is illustrated in Figs. 3 and 4. As shown, the valve 15 is provided with a stem 39 upon which are mounted the solenoid operated levers 38 and 24. The lever 24 is mounted directly upon the squared end portion of the stem, and is held in place by means of a suitable washer 40 and key 41. A spiral spring 25 tends to draw the lever 24 to the right as shown in Fig. 3, while the solenoid operates to move the lever to the left thus operating the valve 15.

The lever 38, on the other hand, is mounted to permit movement of the lever 24 and opening and closing of the valve 15 while the lever 38 remains in retracted position, under the tension of spring 42. For this reason, a certain amount of play of the lever 38 upon the stem 39 is provided, the lever being mounted upon a rounded portion 43 of the stem. This movement is limited, however, by the length of the slot 44 formed in the eye of the lever, a lug or projection 45 formed on the rounded portion of the stem extending into said slot. Thus, the lever 24 may move freely back and forth without in anyway affecting the lever 38. When, however, the solenoid 36 is energized the lever 38 is drawn to the right and the valve 15 is positively closed, regardless of the position of the lever 24.

As shown, a pin 46 is provided upon lever 38, and a hook 47 is hingedly mounted in operative relation thereto. Thus when the lever is moved to the extreme right, the hook 47 engages the pin 46 and positively secures the lever in position. In this manner, the fuel supply is positively cut off, and remains cut off until the pilot light is relighted and the latch 47 is manually released. Preferably, stops 48 and 49 are provided to limit the movement of levers 24 and 38 under the action of solenoids 23 and 36.

It will be noted that in case of any defect in the fluid controlling device 18, such as a leak in the tube 28, the mercury switch will at once shut off the fuel valve. This is a distinct advantage over such devices as fail to cut off the fuel supply in case anything goes wrong with the mechanism.

It will also be noted that in case of any failure of operation in the thermostatic circuit, the fuel will be cut off by the operation of the spring 25 which closes the valve when the solenoid 23 is not in operation.

The device has been described in detail for the purpose of illustration, but it will be evident that it may be modified in various particulars without departing from the spirit of the invention.

Having thus described our invention, what we claim as new and desire to secure by Letters Patent is:—

1. In combination, a main burner, a fuel supply line for said burner, an electrically operated valve in said fuel supply line, a pilot light for the ignition of said main burner, thermostatic means for regulating said valve, means operated by the expansion and contraction of a fluid controlled by said pilot burner for making and breaking the electric circuit which controls said valve, and means operated by said fluid controlled means for positively closing said valve when the pilot light is extinguished.

2. In combination, a main burner, a fuel supply line for said burner, an electrically operated valve in said fuel supply line, a pilot light for the ignition of said main burner, thermostatic means for regulating said valve, means operated by the expansion and contraction of a fluid controlled by said pilot burner for making and breaking the electric circuit which controls said valve, means operated by said fluid controlled means for positively closing said valve when the pilot light is extinguished, and means for locking said valve in closed position.

3. In a device of the character described, in combination, a fluid fuel burning furnace, a main source of fuel supply to said furnace, a pilot light, an electrically operated controlling device for regulating the supply of fuel to said furnace, means operated by the expansion of a fluid and controlled by said pilot light for controlling said electrically operated controlling device, and means operated by the contraction of fluid for positively closing said fuel valve when the pilot light is extinguished.

4. In combination, a fuel burning furnace, a main burner, a fuel supply line for said burner, an electrically operated valve in said fuel supply line, thermostatically operated means responsive to room temperature conditions for controlling said valve to vary the fuel supply to said main burner, a pilot burner for initially igniting said main burner, and a mercury switch, operated, by the expansion or contraction of a fluid controlled by said pilot burner, for making and breaking the electric circuit.

In testimony whereof we affix our signatures.

DAVID L. GORDON.
JESSE G. BOURUS.